United States Patent
Woods et al.

(10) Patent No.: US 11,464,009 B2
(45) Date of Patent: Oct. 4, 2022

(54) RELAYS IN STRUCTURED AD HOC NETWORKS

(71) Applicant: Rockwell Collins, Inc., Cedar Rapids, IA (US)

(72) Inventors: Matthew Woods, Nepean (CA); Mark B. Jorgenson, Kanata (CA); Scott Klassen, Peterborough (CA); Kenneth W. Moreland, Kemptville (CA)

(73) Assignee: Rockwell Collins, Inc., Cedar Rapids, IA (US)

(*) Notice: Subject to any disclaimer, the term of this patent is extended or adjusted under 35 U.S.C. 154(b) by 268 days.

(21) Appl. No.: 16/810,542

(22) Filed: Mar. 5, 2020

(65) Prior Publication Data

US 2021/0282135 A1   Sep. 9, 2021

(51) Int. Cl.
  *H04W 72/04* (2009.01)
  *H04B 7/212* (2006.01)
  *H04B 7/26* (2006.01)
  *H04L 1/00* (2006.01)
  *H04W 84/18* (2009.01)

(52) U.S. Cl.
  CPC ........ *H04W 72/0446* (2013.01); *H04B 7/212* (2013.01); *H04B 7/2656* (2013.01); *H04L 1/0076* (2013.01); *H04W 72/0406* (2013.01); *H04W 84/18* (2013.01)

(58) Field of Classification Search
  CPC ........ H04W 72/0446; H04W 72/0406; H04W 84/18; H04W 88/04; H04W 40/24; H04W 52/46; H04B 7/212; H04B 7/2656; H04L 1/0076; H04L 1/0002; H04L 2001/0097; H04L 1/1819; H04L 1/08
  See application file for complete search history.

(56) References Cited

U.S. PATENT DOCUMENTS

| 4,639,937 A | 1/1987 | McRae et al. |
| 4,827,474 A | 5/1989 | Le Goffic et al. |

(Continued)

FOREIGN PATENT DOCUMENTS

| EP | 0240821 B1 | 1/1993 |
| EP | 0389974 B1 | 6/1997 |

(Continued)

OTHER PUBLICATIONS

Extended Search Report for European Application No. 21161039.9 dated Jul. 21, 2021, 11 pages.

*Primary Examiner* — Rina C Pancholi
(74) *Attorney, Agent, or Firm* — Suiter Swantz pc llo

(57) ABSTRACT

A method of routing a first signal in a telecommunication network is disclosed. The telecommunication network comprises plural nodes and uses time-division multiple access (TDMA) frames, with each TDMA frame divided into time slots and each time slot is divided into subslots. The method includes the step of transmitting a first signal from an initiating node in a first subslot. The method further includes the step of receiving the first signal at other nodes in the network in the first subslot, wherein the first signal is retransmitted in a second subslot subsequent to the first subslot. An improvement in the method includes the step of preparing for the retransmission at least one of a time-dispersed first signal or time-dispersed algorithmically related first signal by two or more nodes via a controller.

13 Claims, 12 Drawing Sheets

(56) References Cited

U.S. PATENT DOCUMENTS

| | | | |
|---|---|---|---|
| 5,155,742 A | 10/1992 | Ariyavisitakul et al. | |
| 5,222,101 A | 6/1993 | Ariyavisitakul et al. | |
| 5,696,765 A | 12/1997 | Safadi | |
| 5,790,598 A | 8/1998 | Moreland et al. | |
| 6,023,477 A | 2/2000 | Dent | |
| 6,594,273 B1 * | 7/2003 | McGibney | H04W 88/04 370/336 |
| 7,023,824 B2 | 4/2006 | Khullar | |
| 7,103,371 B1 | 9/2006 | Liu | |
| 7,156,807 B2 | 1/2007 | Carter et al. | |
| 7,885,251 B2 | 2/2011 | Kim et al. | |
| 7,924,761 B1 * | 4/2011 | Stevens | H03M 13/6306 370/315 |
| 7,925,963 B2 | 4/2011 | Eroz et al. | |
| 7,995,462 B2 | 8/2011 | Gao et al. | |
| 8,392,808 B2 | 3/2013 | Spencer et al. | |
| 8,559,464 B2 | 10/2013 | Caracas et al. | |
| 8,737,285 B2 | 5/2014 | Koguchi et al. | |
| 8,885,631 B2 | 11/2014 | Mo et al. | |
| 9,054,822 B2 | 6/2015 | Brown et al. | |
| 9,185,629 B2 | 11/2015 | Etkin et al. | |
| 9,491,632 B2 | 11/2016 | Sadek | |
| 9,973,304 B2 | 5/2018 | Chessher | |
| 10,277,748 B2 | 4/2019 | Moato et al. | |
| 2007/0195746 A1 | 8/2007 | Ryu et al. | |
| 2011/0019608 A1 * | 1/2011 | Dohler | H04L 41/0893 370/315 |
| 2011/0038356 A1 * | 2/2011 | Bachrach | H04W 72/1231 370/337 |
| 2013/0301633 A1 | 11/2013 | Brown et al. | |
| 2015/0163720 A1 | 6/2015 | Barros et al. | |
| 2016/0366634 A1 * | 12/2016 | Khalife | H04W 84/18 |
| 2017/0004400 A1 | 1/2017 | Frericks et al. | |

FOREIGN PATENT DOCUMENTS

| | | |
|---|---|---|
| EP | 0670640 A3 | 7/2000 |
| EP | 0994596 A3 | 10/2001 |

* cited by examiner

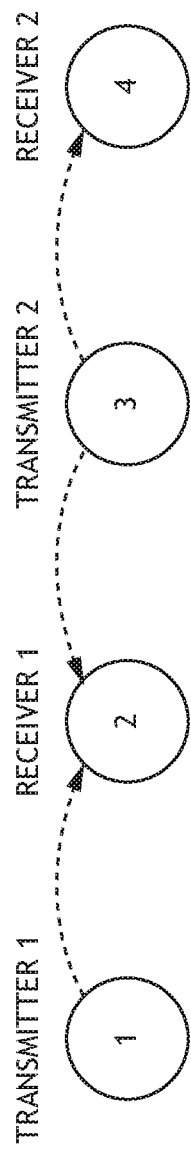
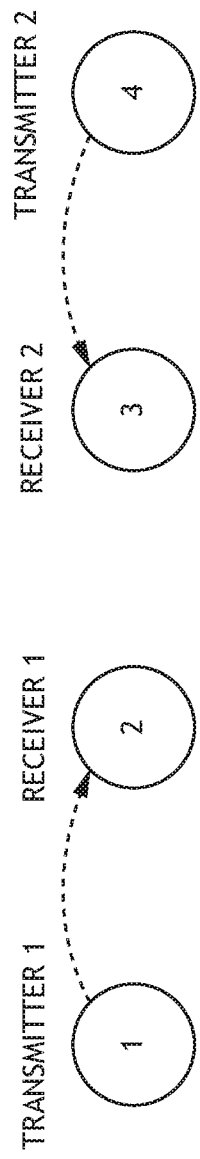
FIG. 10A
FIG. 10B

RELAYS IN STRUCTURED AD HOC NETWORKS

BACKGROUND

Previously, methods for managing relays within a network were proposed using a synchronized time-division multiple access (TDMA) scheme in a wideband channel. The general approach is to divide a TDMA slot into subslots and arrange for every node that heard a transmission in a subslot to retransmit exactly the same message in the next subslot. An initial transmission would be relayed by all of its neighbors, then relayed by neighbors of neighbors and so on for as many subslots as were provisioned. The necessary condition for this to work is that the receivers need to be able to incorporate the artificial multipath created by the multiple transmitters for each relay stage. These methods were successful in implementing relays in some wideband TDMA systems at that time. However, the demands of many of today's RF networking environments make implementation of that method difficult or unfeasible. As such, there is a desire to improve upon and/or enhance the method to make implementation of the method obtainable.

SUMMARY

A method of routing a first signal in a telecommunication network is disclosed. In some embodiments, the telecommunication network comprises plural nodes. In some embodiments, the telecommunication network uses time-division multiple access (TDMA) frames. In some embodiments, each TDMA frame is divided into time slots. In some embodiments, each time slot is divided into subslots. In some embodiments, the method includes the step of transmitting a first signal from an initiating node in a first subslot. In some embodiments, the method includes the step of receiving the first signal at other nodes in the network in the first subslot. In some embodiments, the method includes the step of retransmitting the first signal or an algorithmically related first signal in a second subslot subsequent to the first subslot. In some embodiments, an improvement in the method includes the step of preparing a retransmission of at least one of the first signal or the algorithmically related first signal by two or more nodes via a controller, wherein at least two of the first signals or the algorithmically related first signals are time-dispersed.

In some embodiments, one or more nodes are configured to control multipath spreading by dithering retransmission delay, wherein a node determines multipath spreading through at least one of self-assessment by the node or reception of control data from another node.

In some embodiments, the first signal of at least one subslot is combined with a replica or algorithmically related first signal of at least one other subslot to increase the probability of reception.

In some embodiments, one or more nodes are further configured to repeat the receiving and retransmitting of a first signal or an algorithmically related first signal by the other nodes in subsequent subslots In some embodiments, the method includes the step of operating a coding scheme, wherein the first signal or the algorithmically related first signal further includes a forward error correction code with a rate of less than or equal to one. In some embodiments, the step of operating a coding scheme further includes the step of recovering the data from the first signal or the algorithmically related first signal and validating the data, wherein the retransmission of the first signal or the algorithmically related first signal in the subsequent subslot is further prepared to contain parity bits derived from the data of the first signal or the algorithmically related first signal. In some embodiments, the step of operating a coding scheme further includes the step of recovering the data from the first signal or the algorithmically related first signal. In some embodiments, the step of recovering the data from the first signal or the algorithmically related first signal includes the step of evaluating the data from at least one of the algorithmically related first signal or a combination of the first signal and the algorithmically related first signal. In some embodiments, the step of recovering the data from the first signal or the algorithmically related first signal further includes the step of validating the integrity of the data, wherein the retransmission of the first signal or the algorithmically related first signal is further prepared to contains parity bits derived from the data of the first signal or the algorithmically related that are different from the parity bits of one or more preceding retransmissions. In some embodiments, the coding scheme further includes the step of recovering the data from the first signal or the algorithmically related first signal. In some embodiments, the step of recovering the data from the first signal or the algorithmically first signal further includes the step of evaluating the data from any combination of the first signal and subsequent algorithmically related signals, validating the integrity of the data, wherein the retransmission of the first signal or the algorithmically related first signal further is prepared.

In some embodiments, the combination of the received first signal or algorithmically related first signal can at least one of increase the number of decoding algorithms that can recover the data or decrease the code rate.

In some embodiments, the telecommunication network further comprises a feedback protocol. In some embodiments, a data transmission slot is designated as a negative-acknowledgement (NACK) slot. In some embodiments, the feedback protocol designates a slot to at least one of object to a scheduled increase in dither or request a reduction in dither.

In some embodiments, the feedback protocol further includes an automatic repeat request (ARQ) protocol using the NACK slot to provide feedback to request a repeated transmission of data.

In some embodiments, the telecommunication network is further configured to at least one of increase the number of subslots in a slot depending on one or more data signals sent from one or more nodes or decrease the number of subslots in a slot depending on one or more data signals sent from one or more nodes.

In some embodiments of the method, the telecommunication network includes a slot dedicated to at least one of vetoing a change in subslot number or request an increase in subslot number.

In some embodiments, the method further includes requiring each node to report a unique identification when they are the initiating node. In some embodiments, the method further includes requiring all nodes to report what nodes they hear a primary transmission of the first signal or the algorithmically related first signal from with an indication of link margin. In some embodiments, the method further includes reducing the power of a node if all neighboring nodes report a sufficient link margin to allow a reduction in power. In some embodiments, the method further includes evaluating variability of at least one of connectivity or topology of the telecommunication network through adjusting at least one of data rates, power, or modulation. In some embodiments, the method further includes managing global power through a slot dedicated to power management.

In some embodiments, the initiating node is further configured to transmit a second signal or an algorithmically related second signal in a subslot subsequent to the first subslot on a different frequency than the retransmitted first signal or an algorithmically related first signal.

In some embodiments, the node that retransmits the first signal or the algorithmically related first signal is configured to retransmit the first signal or the algorithmically related first signal in a subslot subsequent to the first subslot on a different frequency.

In some embodiments, at least one node not within the range of the initiating node is configured to transmit a at least one of a second signal or an algorithmically related second signal in a first subslot and/or second subslot subsequent to the first subslot on a different frequency than the transmitted first signal or the algorithmically related first signal.

The method of claim 1, wherein an initial TDMA frame starts asynchronously on the transmission of a first signal by a primary transmitter.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 10A is a diagram illustrating two transmitters operating in a telecommunication network with on-air collisions, in accordance with one or more embodiments of this disclosure.

FIG. 10B is a diagram illustrating two transmitters operating in a network without on-air collisions, in accordance with one or more embodiments of this disclosure.

DETAILED DESCRIPTION

Figure 1:
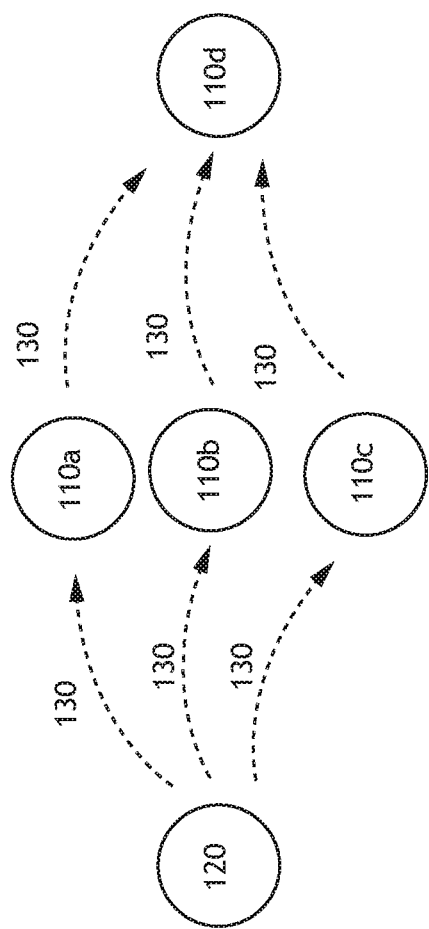
FIG. 1 is a diagram illustrating a communication system wherein an initiating node transmits a first signal or an algorithmically related first signal to three nodes, all which relay the transmission to a single node, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or subcombination of two or more such features, along with any other features which may not necessarily be expressly described or inherently present in the instant disclosure.

Embodiments of the inventive concepts here are directed to improvements of a method for routing signals using relays in an ad hoc TDMA communication network. The use of ad hoc relays in a TDMA communication network are described in U.S. Pat. No. 6,594,273, filed Jul. 9, 1999 and U.S. Pat. No. 4,639,937, filed Dec. 7, 1983. The entirety of both patents is hereby incorporated by reference as if set forth in their entirety. In some embodiments, the waveform may be a time division multiple access (TDMA) based waveform that supports frames, time slots and subslots. Data streams are divided into frames, which are then divided into time slots. The time slots can be allocated to users statically and/or dynamically for different purposes, including transmitting data, voice, relaying data, and performing network management. Time slots may be further divided into subslots, allowing the transmission of a variety of one or more signals into one or more subslots within a time slot.

In some embodiments, subslots are dedicated to the same message or specific parts of the same message. For example, an initiating node may send an initial portion of a signal on an initial subslot. The receiving node that receives the initial portion of the signal on the initial subslot may then retransmit the signal on a second subslot to another node. In another example, the initiating node may send multiple portions of a signal in multiple subslots. The receiving node may receive these multiple portions of a signal on multiple subslots, then retransmit one or more portions of these signals on subsequent subslots. A node may have multiple uses for a subslot within a slot. For example, a node may reuse a subslot for traffic management on an opportunistic basis. Several uses and combination of uses of subslots by nodes are possible. Alternatively, a node may be excluded from using a subslot, and vice-versa. Therefore, the description of nodes and subslots herein should not be interpreted as a limitation, but merely as an illustration.

For example, a TDMA slot may be split into six subslots, wherein three of the subslots may be dedicated to a single channel, with one subslot dedicated to a first signal (i.e., the transmission of a signal by the initiating node 120), and two subslots dedicated to relay purposes. It is noted that a TDMA based waveform is different from a conventional point to point contention-based waveform, which does not depend on the knowledge of time. It is contemplated that a TDMA based waveform may be better suited to support a large number of nodes, and that many of these nodes may be used to receive and retransmit data as a relay node, provide improved efficiency, efficacy, and resource allocation compared to a conventional contention-based waveform. It should also be noted that the terms slots, time slots and subslots may at times be used interchangeably It is noted that the first signal, once transmitted by the initiating node 120, retains the status as the first signal after retransmission through another node 110, as the message encoded by the signal does not change. It is also noted that a first signal that is encoded (e.g., to produce an algorithmically related first signal) by a node 110 and transmitted is may still referred to as a first signal or may be referred to as an algorithmically related first signal (i.e., the first signal retains the same message, whether or not a retransmission of the first signal has been encoded). In the interest of clarity, a subsequent signal transmitted by an initiating node that contains a message different that the first signal is referred to as a second signal.

FIG. 1 is a diagram depicting a telecommunication network 100 in accordance with one or more embodiments of this disclosure. In some embodiments, the telecommunication network 100 includes a plurality of nodes 110. A node 110 is a connection point that can receive, create, modify, store, or send data along a telecommunication network 100. For example, the majority of nodes 110 in the telecommunication network 100 may be configured to receive and send data in the telecommunication network 100. In another example, a node 110 may be able to receive and send data as well as modify the signal. For instance, the node 110 may be able to send or retransmit data at a different frequency than another node 110. In another instance, the node 110 may be able to retransmit the data with a variable time delay. In another instance, the node 110 may be able to retransmit the data with a different modulation.

In some embodiments, the retransmitted first signal is exactly the same signal (e.g., a replica) as the initial transmission of the first signal by the initiating node 120. In some embodiments, the retransmission is a signal different from initial transmission of the first signal by the initiating node 120 that carries the same message. For example, the retransmission may be a transmission algorithmically related to the first signal that would improve the probability of receivers to recover the information encoded in the initial transmission of the first signal by the initiating node 120, while still allowing the message of the initial transmission of the first signal by the initiating node 120 to stay intact. This replication of the original transmission of the first signal by the initiating node 120 may be repeated through several iterations as the message is transmitted and retransmitted though different relays. The use of multiple transmissions of first signals, algorithmically related first signals, and replica signals of first signals and algorithmically first signals is intended to increase the probability of reception.

A node 110 may take the form of any communication device capable of receiving or sending a signal. For example, a node 110 may take the form of a mobile device (e.g., a cellular phone or mobile military radio). In another example, a node 110 may be a fixed-site node. The node 110 may have differing power capabilities within the network. For example, the telecommunication network 100 may contain both a fixed-site transmitting node 110 with greater than 1 kW capabilities, and a mobile node 110 with constrained power usage and transmitting capabilities.

The nodes 110 or the telecommunication network 100 may be arranged by any method or topology that allow nodes 110 to receive and send data from other nodes 110. For example, the nodes 110 may be arranged in an ad hoc telecommunication network 100.

In embodiments, the telecommunication network 100 includes an initiating node 120. The initiating node 120 initiates the sending of a first signal 130 through the telecommunication network 100. For example, the initiating node may transmit the first signal 130 to nodes 110 within range (e.g., nodes 110a-c). Nodes 110a-c receiving the first signal 130 may then retransmit the first signal 130 to other nodes (e.g., node 110d that are in range. In some embodiments, a node 110 that received the transmission from the initiating node 120 may retransmit the first signal 130 back to the initiating node. The initiating node 120 may have similar characteristics to the other nodes 110 within the telecommunication system. For example, the initiating node 120 may be a mobile radio unit, with the plurality of nodes within the telecommunication network 100 also being mobile radio units. In some embodiments, the initiating node 120 may have different characteristics than other nodes 110 in the telecommunication network 100. For example, the initiating node 120 may be a fixed-site transceiver, with the other nodes 110 being mobile radio units.

Figure 2:
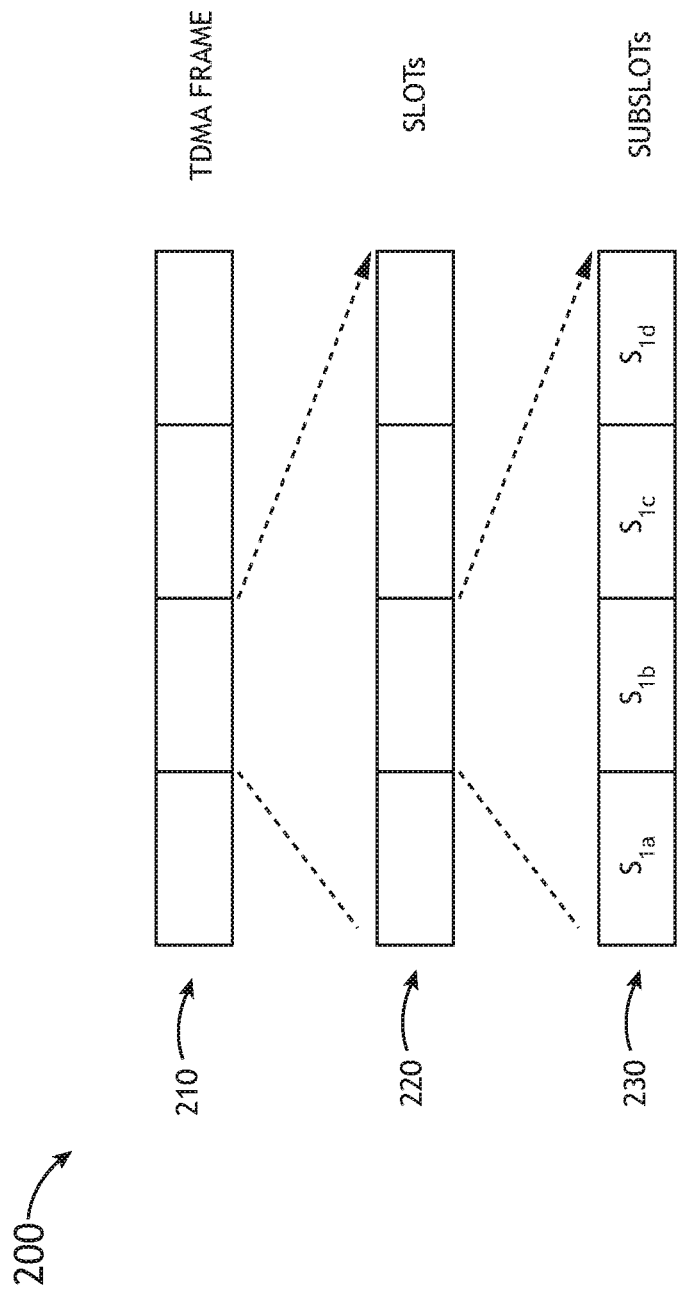
FIG. 2 is a diagram illustrating a TDMA frame arrangement, in accordance with one or more embodiments of this disclosure.

FIG. 2 is a diagram illustrating a TDMA data stream 200, in accordance with one or more embodiments of this disclosure. TDMA allows multiple users to transmit on a single frequency, with each user given one or more portions of time within a longer time period to transmit a signal. TDMA time periods are commonly divided into frames 210, with each frame 210 divided into time slots 220. Time slots 220 are defined periods in time that a user may transmit a signal using the TDMA architecture. The data transmitted from the node 110 within a time slot 220 may include not only the payload data that the user wants to send (e.g., voice data) but also control data that assists in signal synchronization and propagation. This control data is often included in a preamble of the data stream.

In some embodiments time slots 220 are further divided into subslots 230. As previously stated herein, subslots 230 may be utilized to support relay node utilization within the ad hoc communication network 100. Nodes 110 acting as relays may relay the same signal (e.g., data) or signals that have been algorithmically derived from the data received from the first signal 130. In some embodiments, nodes 110 may retransmit once within the slot (e.g., a subsequent subslot 230). In some embodiments, nodes 110 may retransmit more than once within the slot. In some embodiments, nodes 110 may transmit at every opportunity within the time slot 220. It should be noted that initiating nodes 120 or other transmitting nodes 110 that determine that they are the sole connection to other nodes 110 may transmit their signal more than once. In some embodiments, the TDMA structure only contains subslots 230 (e.g., with time slots 220 and/or frames 210 omitted). In some embodiments, the subslots 230 may start asynchronously or synchronously, depending on the structure and need of the network. In some embodiments, an initial TDMA frame starts asynchronously on the transmission of a first signal 130 by a primary transmitter. In some embodiments, the telecommunication network 100 does not have a TDMA structure.

Figure 3:
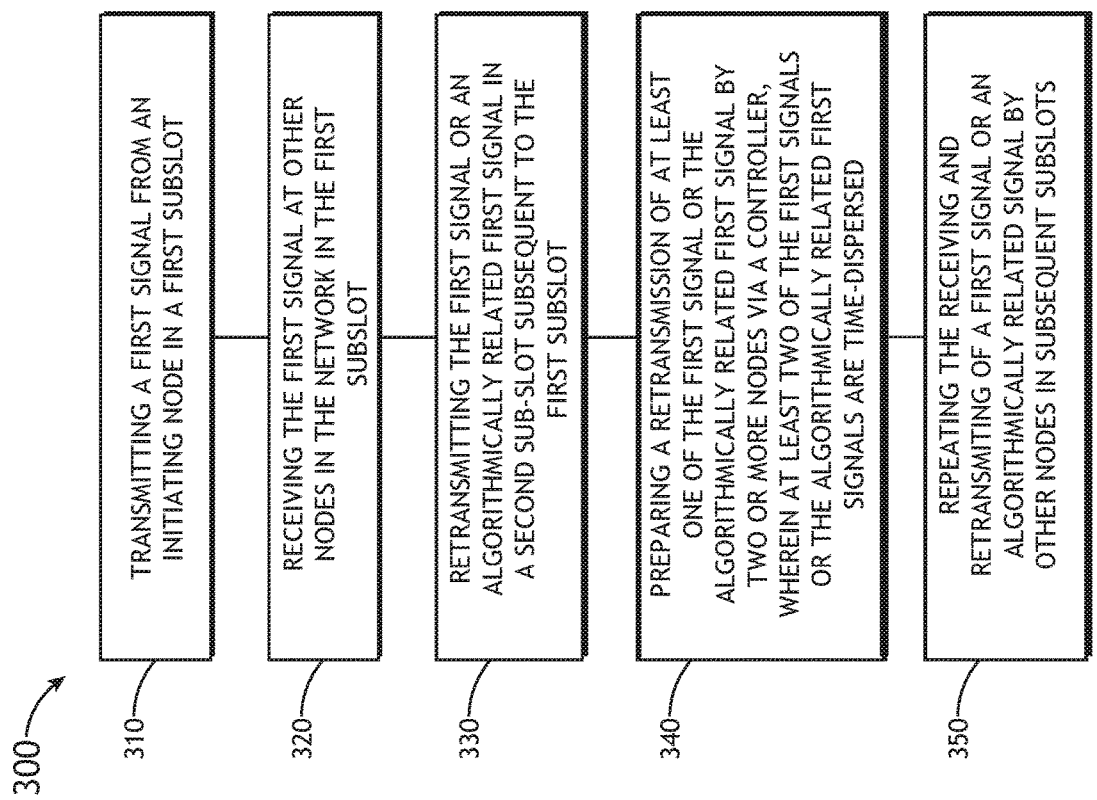
FIG. 3 is a flow diagram illustrating a method of modeling transmitting a first signal or an algorithmically related first signal to nodes using multiple subslots, in accordance with one or more embodiments of this disclosure.

FIG. 3 is a flow chart illustrating the steps for the method 300 for using subslot 230 in the telecommunication network 100. In some embodiments, the method 300 includes the step 310 of transmitting a first signal 130 from an initiating node 120 in a first subslot 230. An illustration of the first signal 130 being transmitted from an initiating node 120 is shown in FIG. 1. FIG. 2 illustrates the designation of the first subslot 230 as subslot $S_{1A}$.

In some embodiments, the method includes the step 320 of receiving the first signal 130 at other nodes 110 in the network in the first subslot. For example, in FIG. 1, the first signal 130 is received by the node 110a in the first subslot $S_{1a}$ after being sent from the initiating node 120. The first signal 130 may also be received by other nodes 110b-c in the first subslot $S_{1a}$ if they are in range of the initiating node 120.

In some embodiments, the method 300 includes the step 330 of retransmitting the first signal 130 or an algorithmically related first signal 130 in a second subslot 230 subsequent to the first subslot. For example, in FIG. 1, node 110a retransmits the first signal 130 to other nodes 110b-c in the telecommunication network in a subsequent subslot 230 (e.g., subslot $S_{1b}$ in FIG. 2).

In some embodiments, the method 300 further includes the improvement step 340 of preparing a retransmission of at least one of the first signal or the algorithmically related first signal by two or more nodes via a controller, wherein at least two of the first signals or the algorithmically related first signals are time-dispersed. Time-dispersion of multiple signals (e.g., also referred to as multipath or relay diversity) creates a robust signal, allowing a receiver to resolve the signal in separate paths. For example, if time-dispersed signal (e.g., two or more signals with slightly different delays) are transmitted from multiple transmitter and received by a single receiver fading of the signal from each separate transmitter is likely to be uncorrelated resulting in a higher likelihood of the receiver recovering the message when the signals are dispersed in time sufficiently to allow the receiver to resolve the individual paths. In still another example, the first signal 130 or an algorithmically related first signal may be retransmitted by multiple nodes simultaneously multiple times. With every time a node then hears a transmission and/or retransmission, the node has a better chance of correctly receiving the transmission. Methods and devices for creating a time-dispersed signal are described herein.

The step 340 of preparing a time-dispersed transmission or retransmission of at least one of the first signal 130 or a time-dispersed algorithmically related first signal by two or more nodes via a controller may occur at any point within the method 300. Step 340 may occur before the transmission of the first signal 130 or the algorithmically related first signal. In the case of coordinated NACKs, a controlling element prepares a coordinated transmission of replica signals by all nodes transmitting in that slot. As another example, the step 340 may occur after the reception of a first signal 130 from an initiating node 120 to a receiving node 110 and before the retransmission of the first signal 130 or the algorithmically related first signal by the receiving node. The retransmission (e.g., time-dispersed) may be prepared in response to a previous reception or receptions, where the controlling elements at individual nodes ensure that signals transmitted by multiple nodes that overlap in time and frequency are all replicas of the same signal. In the case of the NACK slot, there is no transmission to relay, but the NACK is in response to previous reception(s), or lack thereof (e.g., missed data). It should be known that the time-diverse retransmission may be transmitted in response to the signal to be relayed (e.g., as in a TDMA network), or in response to an asynchronous first signal that may or may not eventually organize within an ad hoc network to form a TDMA relay structure.

In some embodiments, the method 300 further includes the step 350 of repeating the receiving and retransmitting of a first signal 130 or an algorithmically related first signal by other nodes in subsequent subslots. The step 350 may be repeated a number of times, with each set of repeated steps adding data from the first signal 130 or an algorithmically related first signal to subsequent subslots (e.g., slots $S_{1c}$ and $S_{1d}$ in FIG. 2). Contacting every node 110 in the network ensures that the first signal 130 or an algorithmically related first signal 130 will reach the intended node 110. It should be noted that as the number of relays required to allow a signal to propagate across an entire network increases, the number of subslots required to manage the relaying of signal increases as well. Therefore, the number of subslots utilized in the telecommunication network 100 may need to be adjusted according to the topography and number of the relay nodes 110. The method 300 does not require routing tables, simplifying the routing process. Signals that return to nodes 110 that have already transmitted or received the first signal 130 or an algorithmically related first signal 130 will convey to the node 110 information regarding the structure, status or other characteristic about the communication network 100. However, these signals may not be retransmitted.

In some embodiments, one or more nodes 110 of the telecommunication network 100 is further configured to control multipath spreading by varying transmission delay with respect to a time reference (start of a subslot or time of reception of the signal to be relayed for example). Diversity relay is a multipath-controlling method for ensuring that a transmitted signal reaches its destination, as the higher number of paths that the signal takes, the greater probability that the signal will be received by the intended node 110.

Multipath time relay provides greatest benefit when the time dispersion at the node 110 is sufficient to allow the node 110 to resolve separate paths, but not so great as to exceed the multipath delay spread capabilities of the node 110 (e.g., such as when using an equalizer or rake receiver). It is also desirable to create a time diverse path in the event that the physical geometry doesn't provide sufficient delay separation between individual relay transmissions. In some embodiments a time diverse path is accomplished by having nodes stagger or dither their transmission (i.e., control multipath spreading by dithering retransmission delay) with respect to the nominal slot start, either deterministically, or in a pseudo random fashion. In some embodiments, the node 110 may determine multipath spreading by self-assessment. In some embodiments, the node 110 may determine multipath spreading through the reception of control data form another node.

Figure 4:
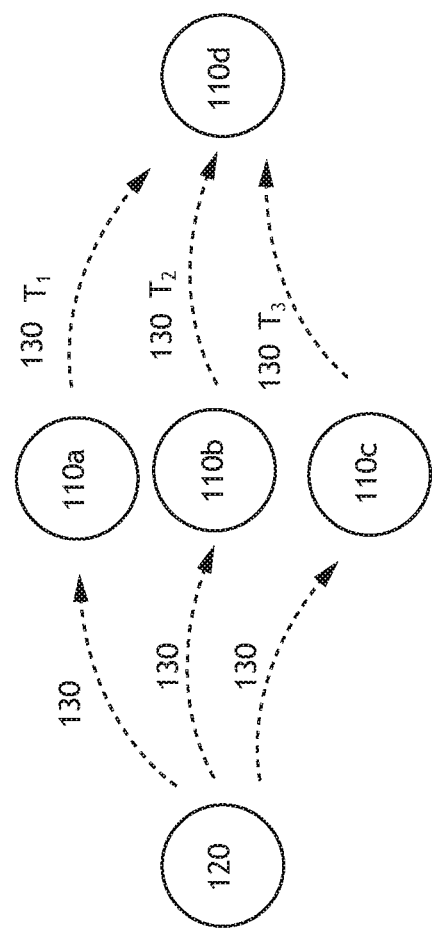
FIG. 4 is a diagram illustrating a communication system containing nodes used as relays in a time-diverse multipath arrangement, in accordance with one or more embodiments of this disclosure.

FIG. 4 is a diagram illustrating a communication system containing nodes 110 that relay the first signal 130 or the algorithmically related first signal 130 in a time-diverse multipath arrangement, in accordance with one or more embodiments of this disclosure. Here, a first signal 130 is transmitted from an initiating node 120 to other nodes 110a-c in the telecommunication network 100. Upon receiving the first signal 130, the receiving nodes 110a-c retransmits the first signal 130 or the algorithmically related first signal 130 to a node 110d that is an intended destination of the first signal 130. It should be noted that one, more than one, or all nodes 110 of the communication network 100 may be targeted to receive the first signal 130 or the algorithmically related first signal. One or more retransmissions from the retransmission nodes 110a-c may be time delayed (e.g., T1, T2 or T3 in FIG. 4) so that the receiving node 110d receives the first signal 130 or the algorithmically related first signal as a time-diverse spread signal. For example, if nodes 110a-c transmit precisely on the start of the subslot, the signals are received at 110d at the respective time of propagation from each node to 110d following the start of the subslot. If the distance from 110a-c to 110d is the same for all three paths, the signals would be received at exactly the same time. Introducing a variable time delay between 110a-c retransmissions can spread the reception time at 110d out to optimize the time dispersion for reception.

In some embodiments, the decision to control multipath spreading can be taken locally or globally. The key limitation is that the delay dither should not result in received multipath that exceeds the design capability of the node 110 or telecommunication network 100. At the global level, a node 110 may determine multipath spreading through self-assessment. All nodes 110a-c have the ability to monitor the delay spread that they are seeing and if any of them detect delay spread approaching their limit, the nodes 110a-c would transmit a signal to reduce spread in a slot 220 or subslot 230 designated for signal-spreading control data. If nothing is heard in that slot 220 or subslot 230 for a period of time, time-delay of the signal may be increased by some modest amount. If a node 110 indicates that it is approaching its multipath delay spread capability by transmitting the agreed upon signal, the multipath delay spread would be decreased and maintained at the lower level for a longer period (e.g., hysteresis) before allowing a future increase.

At a local level, multipath delay can be managed between neighbors. Fundamentally, the only transmissions that matter to a node 110 are transmission to and from neighboring nodes 110, and not transmissions to and from nodes 110 not within range. With that in mind, each node 110 is able to assess locally what delay spread it is seeing and could report that metric when it transmits (e.g., the node 110 may receive control data from other neighboring nodes 110). If all of a node's neighbors report low delay spread, a node 110 may increase the time delay that it retransmits the signal. Alternatively, at the cost of additional overhead, nodes can explicitly report which nodes that they are hearing (e.g., when they transmit in the first subslot and include a node identifier field, but not in a subsequent subslot) and signal characteristics such as received SNR and delay.

Figure 5:
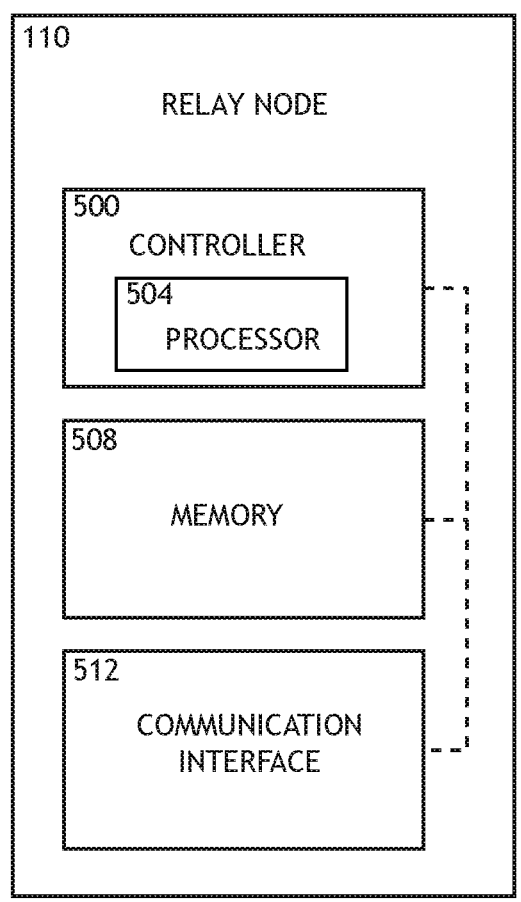
FIG. 5 is a block diagram illustrating a node used for relaying a first signal or an algorithmically related first signal, in accordance with one or more embodiments of this disclosure.

FIG. 5 is a block diagram illustrating a node 110 used for relaying a first signal 130 or the algorithmically related first signal 130, in accordance with one or more embodiments of this disclosure. As mentioned herein, the nodes 110 are configured to opportunistically receive a first signal 130 from the initiating node 120, and retransmit the first signal 130 or the algorithmically related first signal to another node 110.

In some embodiments, the relay nodes 110 include a controller 500. The controller 500 provides processing functionality for the relay node 110 and can include any number of processors 504. The one or more processors 504 may include any processors 504 used in the art including, but not limited to, field programmable gate arrays (FPGA), and application-specific integrated circuits (ASIC). The controller 500 may utilize the one or more processors 504 to receive and decode incoming transmissions and recode and retransmit the relayed transmissions. The controller 500 may also include resident or external memory 508 for storing data, executable code, and other information accessed or generated by the relay node 110. The controller 500 can execute one or more software programs embodied in a non-transitory computer readable medium (e.g., a memory 508) that implements techniques described herein. The controller 500 is not limited by the materials from which it is formed or the processing mechanisms employed therein.

The memory 508 can be an example of a tangible, computer-readable storage medium that provides storage functionality to store various data and/or program code associated with operation of the relay node 110 and or controller 500, such as software programs and/or code segments, or other data to instruct the controller 500, and possibly other components of the relay node 110. The memory 508 can store data, such as a program of instructions for operating the relay node 110 and/or incoming data from the first signal 130 or the algorithmically related first signal 130. It should be noted that while a single memory 508 is described, a wide variety of types and combinations of memory 508 (e.g., tangible, non-transitory memory) can be employed. The memory 508 can be integral with the controller 104, can comprise stand-alone memory, or can be a combination of both. Some examples of the memory 508 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments the relay node 110 includes a communication interface 512. The communication interface 512 can be operatively configured to communicate with the components of the relay node 110 and the controller 500. For example, the communication interface 512 can be configured to retrieve data from the controller 500 or other devices, transmit data for storage in memory 508, retrieve data from storage in memory, 508 and so forth. The communication interface 512 can also be communicatively coupled with the controller 500 to facilitate data transfer between components of the relay node 110 and the controller 500. It should be noted that while the communication interface 512 is described as a component of the relay node 110, one or more components of the communication interface 512 can be implemented as external components communicatively coupled to the relay node 110 via a wire and/or wireless connection. The relay node 110 may also include and/or connect to one or more input/output (I/O) devices. In embodiments, the communication interface 512 includes or is coupled to a transmitter, receiver, transceiver, physical connection interface, or any combination thereof.

In some embodiments, the first signal 130 or the algorithmically related first signal 130 of at least one subslot 230 is combined with a replica or algorithmically related first signal or the algorithmically related first signal 130 of at least one other subslot 230. When exactly the same signal is used for more than one subslot 230, nodes 110 receiving the first signal 130 or the algorithmically related first signal 130 can combine information obtained in the two subslots 230 to improve the received first signal or the algorithmically related first signal 130 to the point where it can be successfully decoded. Subslots 230 may be combined using soft decisions, which uses metrics for the quality of received bits or symbols to weight the contribution from each copy of the same bit or symbol in the detection process. If the initial detection is insufficient to recover the message, possibly as indicated by failing a cyclic redundancy check (CRC), incorporation of soft-decision information (e.g., at the bit level) from subsequent subslots 230 may suffice to recover the message without error. Alternatively, analogous first signals 130 may be captured, retained, and the subslots 230 combined by any of the commonly used diversity receive combining techniques. By combining subsequent slots in this manner, the subsequent impulse response may be assessed and used to determine if artificial delay may be added to increase multipath capabilities (e.g., an enhancement in diversity gain).

Figure 6:
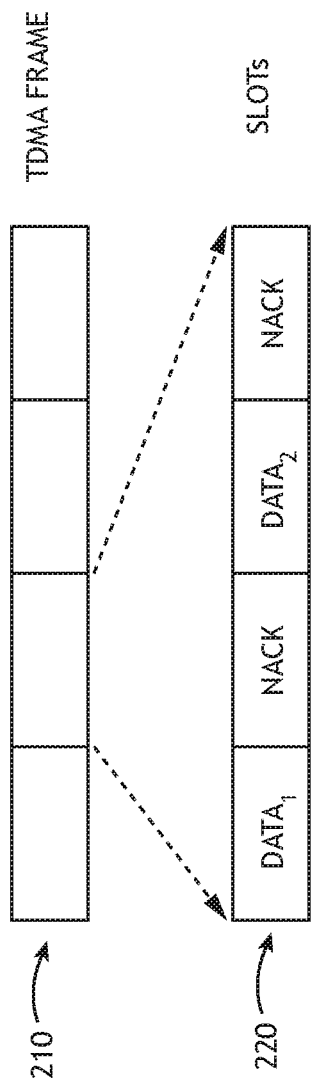
FIG. 6 is a diagram illustrating the incorporation of a NACK signal into a slot, in accordance with one or more embodiments of this disclosure.

In some embodiments, the telecommunication network 100 further comprises a feedback protocol. Feedback protocols are necessary in networks to resolve or prevent errors in data transmissions. In some embodiments, the feedback protocol is generated by designating a slot 220 following a data transmission slot 220 as a negative-acknowledgement (NACK) slot 220, as shown in FIG. 6. Any nodes 110 that require retransmission transmit the identical retransmission request in the slot 220, which could then be relayed in subslots 230. A single node 110 or multiple nodes 110 requiring retransmission will provide the same NACK when multiple nodes send a NACK simultaneously, the result is beneficial rather than destructive because the receiving nodes 110 see the same kind of artificial multipath as in McGibney diversity relay. In some embodiments, the feedback protocol includes an automatic repeat request (ARQ) protocol. It should be noted that NACK requests are prepared before the coordinated retransmission of first signals or algorithmically related first signals by all nodes 110 transmitting in a slot (i.e., the NACK is not a rebroadcast of the first signal 130).

Adaptation of global dithering of timing to improve received time dispersion of relayed signals may also be accomplished in a fashion similar to negative acknowledgment based ARQ protocols. In some embodiments, data slots 220 are designated to allow a receiving node 110 to at least one of object to an increase in dither or request an increase in dither. The global dither can therefore be managed by the telecommunication network 100 at the node 110 level with low overhead. It should be noted that dedicated management slots 220 should be far enough apart as to not adversely impact overheads and balanced for adaptability.

Efficiency in telecommunication networks 100 may be increased through optimization of the number of subslots 230 utilized within a data slot 220 of a frame 210. In some embodiments, the telecommunication network 100 is further configured to at least one of increase the number of subslots 230 in a slot 220 depending on one or more data signals sent from one or more nodes or decrease the number of subslots 230 in a slot 220 depending on one or more data signals sent from one or more nodes. In the following two examples, one or more subslots 230 have been designated as subslots one, two and three, and one or more nodes 110 have been designated as nodes A, B, C, D, and E. In one example, the number of subslots 230 in a slot 220 may be reduced if one or more subslots 230 are not utilized. For instance, if node A transmits in subslot one, nodes B and C relay in subslot two, and nodes D and E relay in subslot three, if there are no nodes beyond D and E, that would mean that three subslots 230 were not required and that the message propagated to all nodes 110 within the network within two subslots 230. If all nodes 110 initiating the transmission are found to only require two subslots 230 to propagate the signal to all nodes 110, then the number of subslots 230 may be reduced. In another example, the number of subslots 230 may be increased. For instance, if a node 110 only hears transmissions in the last subslot 230, then the node 110 may object to any reduction in the number of subslots 230. In another instance, if a node 110 detects that there are other active nodes 110 that do not receive a signal, the node 110 may request that the number of subslots 230 increase.

In telecommunication networks 100 where subslot 230 or node 110 reducing protocols are used, conditions may arise where subslot 230 or node 110 numbers should remain the same or even expand. For example, subslot/node expansion may be prioritized as the result of adversarial action or adverse propagation conditions, making the telecommunication network 100 more robust. In some embodiments, the telecommunication network 100 further comprises a slot 220 dedicated to at least one of vetoing a change in subslot 230 number or request an increase in subslot 230 number. For example, a mechanism for vetoing (e.g., NACKing) may be a dedicated slot 220 in which all nodes 110 that wish to maintain the current number of relay opportunities based on the number of subslots 230 transmit an agreed upon message. In another example, a second dedicated slot 220 may be assigned to allow any node 110 requiring more subslots 230 for relaying to transmit an agreed upon message to increase the number of subslots 230.

Figure 7:
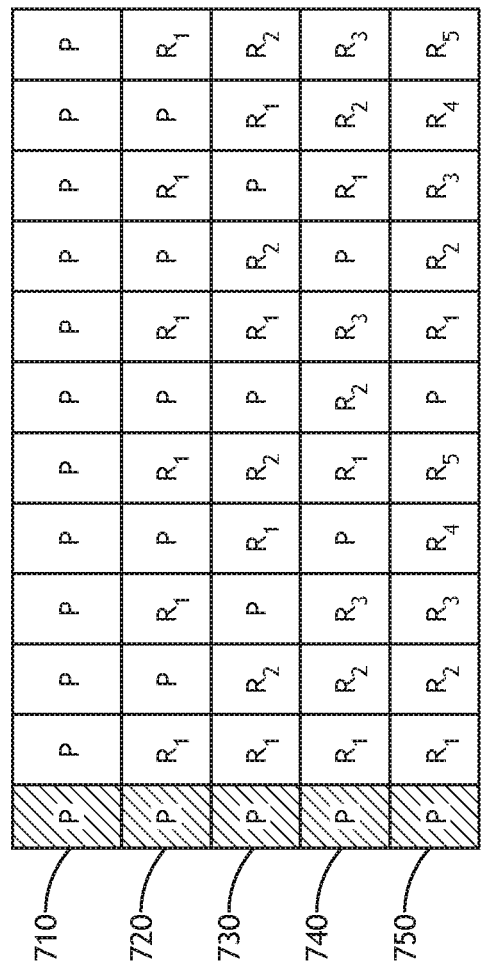
FIG. 7 is a diagram illustrating a series of possible arrangements of subslots, in accordance with one or more embodiments of this disclosure.

FIG. 7 is a diagram illustrating a series 700 of slots (e.g., slots 710-750) with possible arrangements of subslots 230, in accordance with one or more embodiments of this disclosure. In each row, a slot 710-750 begins with a primary subslot 230, designated by a 'P' (e.g., hatched background). Subslots 230 used in a relay context are shown with an 'R' with a subscript indicating which relay level they represent. Aligned primary slots 220 across rows permit adaptation within the slots/subslots between the aligned primary slots to occur with some degree of robustness possible because the aligned primary slots can be consistent across all possible subslot 230 arrangements. Thus, even if a misconfiguration does occur where some elements of the telecommunication network 100 do not receive a change notice, it can be corrected quickly with the aligned primary slots 220. For example, as shown in FIG. 7, an adaptation within the slot structure could include slots with zero, one, two, three, or five relay subslots (e.g., in slots 710-750). In this example, the adaptation rules are modified for a three to five, or five to three, transition as the adaptation is a transformation by two subslots 230, rather than a change by one subslot 230. If less than the maximum number of relay subslots 230 are being used, then an opportunity exists for signals other than the first signal 130 or the algorithmically related first signal 130 to be transmitted. For instance, using the example above, if the most critical service is voice, and voice can be supported by five subslots (e.g., using four relays), the ability to support other services (e.g., chat or file transfer) can be added as the capacity improves (e.g., when the number of relay nodes needed is reduced).

Figure 8:
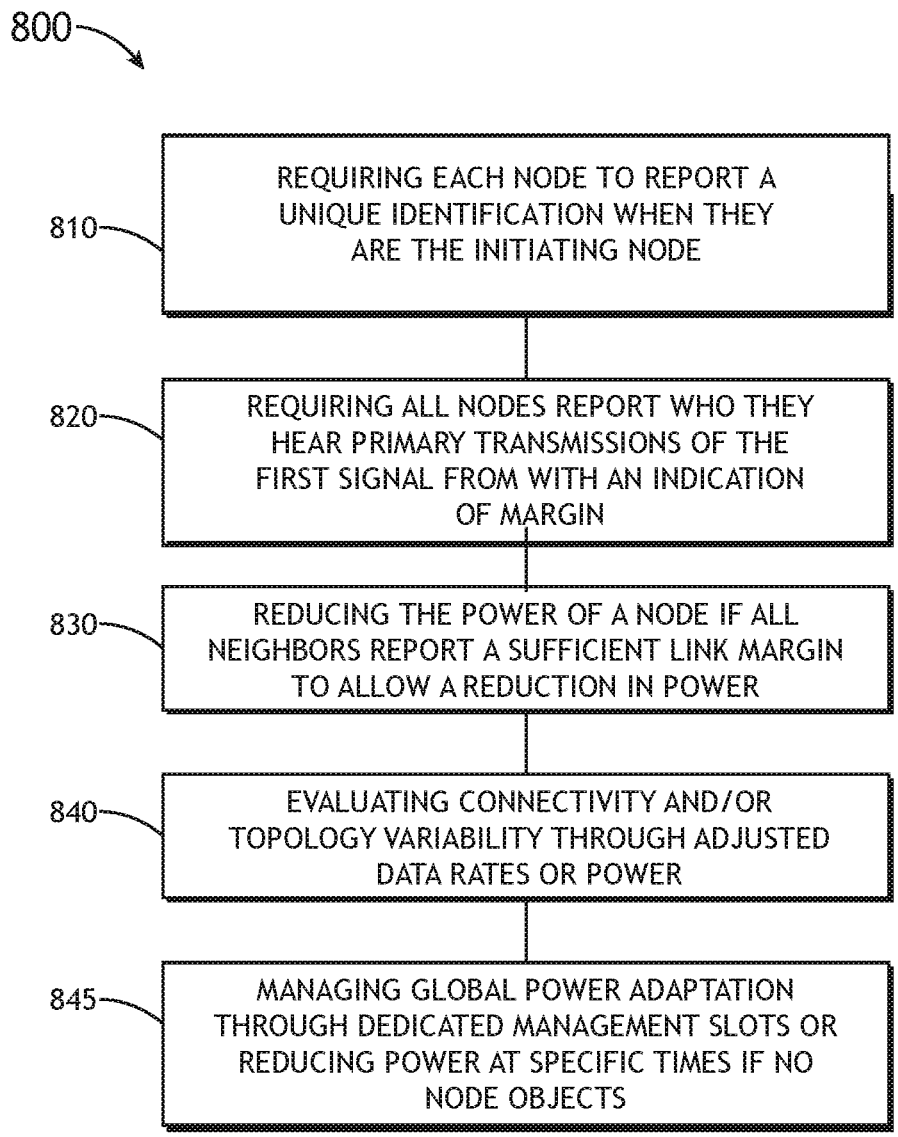
FIG. 8 is a flow diagram illustrating a method for managing power within a network, in accordance with one or more embodiments of this disclosure.

The interconnectivity of nodes 110 within a telecommunication network 100 may also allow the telecommunication network 100 to adjust transmitted power levels for each node 110, optimizing power usage for the entire telecommunication network 100. FIG. 8 is a flow diagram illustrating a method 800 for managing power within the telecommunication network 100, in accordance with one or more embodiments of this disclosure.

In some embodiments, the method 800 includes the step 810 of requiring each node to report a unique identification when they are the initiating node. Node 110 usage data may then be used for local power optimization of the telecommunication network 100. In some embodiments, the method 800 includes the step 820 of requiring all nodes 110 report who they hear primary transmissions of the first signal 130 or the algorithmically related first signal from with an indication of margin. Primary transmission denotes the first time that a node 110 has received the first signal 130 or the algorithmically related first signal. Node 110 reception data may then also be used in local power optimization.

In some embodiments, the method 800 further includes the step 830 of reducing the power of a node 110 if all neighboring nodes 110 report a sufficient link margin to allow a reduction in power. For example, the power of a transmitting node 110 may be reduced if a neighboring node 110 determines that the transmitting node 110 could reasonably operate at half transmission power. In some embodiments, the method 800 further includes the step 840 of evaluating connectivity and/or topology variability through adjusted data rates or power. For example, using a higher data rate may decrease the transmission time of a transmitting node 110, which may decrease power consumption. In another example, using a lower data rate may allow a longer transmission distance, reducing the number of subslot 230 used to relay the signal, thereby reducing the overhead and increasing the data capacity of the telecommunication network 100. In another example, the use of more efficient data transmission waveform may reduce power consumption. For instance, a binary phase shift keying (BPSK) signal may be converted to a quadrature phase shift keying (QPSK) signal, resulting in a doubling of the data rate for the signal and increased power efficiency. In some embodiments, the data rate is set by the node sending the first signal 130 or the algorithmically related first signal. Alternatively, the data rate may be changed by nodes acting as relays along the signal path. However, changes in the data rate must be coordinated with other nodes within the communication network 100 to ensure that all overlapping transmissions are replicas.

In some embodiments, the method 800 further includes the step 845 of managing global power adaptation through dedicated management slots 220 or reducing power at specific times if no node 110 objects. For example, if any node 110 sends the defined agreed upon signal (e.g., or packet) requesting increased power in a management slot 220 designated for power management, then the entire telecommunication network 100 would increase power.

In some embodiments, data rates and/or power management within a communication network 100 may be modified (e.g., optimized) according to changes in network topography. In another example, a lower data rate would be considered if the signal strength dropped because the distance between nodes increased or the power of the nodes had been reduced. In still another example, an overall reduction in the area covered by the communication network 100 (e.g., a communication network 100 that has reduced from covering 10000 square kilometers to 1000 square kilometers, comprising one or more mobile nodes 110) may require fewer subslots to support the necessary number of relays.

In some embodiments, the method 300 further includes the step of operating a coding scheme. In an ad hoc communication network, all nodes 110 acting as a relay need to send a signal that encodes exactly the same message sent from the initiating node 120. However, the signals transmitted by the initiating node and relay node for the same message may differ due to coding schemes (e.g., error correction codes such as convolutional codes), which are then algorithmically derived back into the same message. As the message is sent through the communication network 100, each retransmission improves the error correction coding available to nodes 110 that hear more than one transmission or retransmission.

Subslots used to relay data do not necessarily have to be a direct copy of the first signal 130 or the algorithmically related first signal in all cases. All relays need to send exactly the same signal in response to a received signal, but that does not need to be identical to the received first signal, the constraint is only that signals that overlap at a receiver on a frequency in time must be replicas of one another so that they can be combined. That replica signal can be derived algorithmically from the first signal 130. For example, nodes 110 can compute parity bits from the first signal 130 and send those. If the method for generating the parity bits changes from subslot to subslot but is predefined so all relays do the same thing for every subslot, nodes that are not able to detect a message from a single subslot can improve their likelihood of detecting a message using multiple received subslots, each of which carries different parity bits. The method is general, but specific examples can be given: Reed Solomon codes could be used in one instance, convolutional codes in another, Turbo-codes or LDPC codes in still others.

In some embodiments, the first signal 130 or algorithmically related first signal includes a forward error correction code with a rate equal to or less than 1. Convolutional codes are a type of error-correcting codes that generate parity symbols through a sliding application of a Boolean polynomial function to a data stream, which can then be decoded using the Viterbi algorithm. Convolutional codes are of particular use with fading channels, as they can be used to determine probabilities correctness of bits for signals within transmissions where errors are present (e.g., through soft decision decoding). Convolutional codes may be systematic, where the encoded message includes the original data bits, potentially interleaved or permuted, as well as parity bits derived from the original data bits. Non-systematic codes do not send the original data bits, but only bits derived from the polynomial functions. In general, non-systematic codes are preferable when convolutional codes are employed with a traditional Viterbi maximum likelihood decoder. When convolutional codes are used to form a code that is decoded by with a turbo-code approach, systematic convolutional codes are preferred. In either case, so long as the code rate is 1 or less, the original message can be recovered if there are no errors in the transmission. Lowering the rate of the code improves the ability to recover the original message in the presence of errors.

In some embodiments, the coding scheme may include the step of recovering the data in the first signal 130 or algorithmically related first signal and validating the integrity of the data. An illustrative example, a non-systematic convolutional code could use a rate 1/3 convolutional code, using 3 polynomials to generate the encoded message. If the output of the first polynomial were sent as the primary message, with a CRC appended, the original message could be recovered if there were no errors in the reception. In the first subsequent subslot, all transmissions could use the output of the second polynomial, again with a CRC appended. Retransmissions by nodes that received the primary message would be made by detecting the first signal 130 or the algorithmically related first signal, confirming from the CRC that it was not corrupted, recovering the original message bits, encoding them with the rate 1/3 encoder and using the bits from the second polynomial as the basis of the re-transmission. Similarly, for the second subsequent subslot, the message would be based on the bits encoded by the third polynomial. A receiver can attempt to decode the message with any individual slot as a rate 1/3 code, punctured to rate 1. If it receives any two subslots, it can attempt the decoding as a rate 1/3 code punctured to rate 1/2. If it receives all three subslots, the decoding can use the full power of the rate 1/3 code. An obvious extension to this includes sending encoded messages which have some amount of redundancy to allow for error correction, for example, by basing the messages on a rate 1/4 convolutional code, with the primary message consisting of the output of the first polynomial and the first ⅓ of the bits output from the fourth polynomial. The second subslot would use the encoded bits from the second polynomial and the second ⅓ of the bits from the fourth polynomial and the third sub-slot would use the output of the third polynomial and the last ⅓ of the bits from the fourth polynomial. There are many possible variations on this basic approach.

In some embodiments, the coding scheme may include evaluating the data from at least one of the algorithmically related first signal or a combination of the first signal 130 and the algorithmically related first signal. For example, the evaluation of the first signal 130 and the algorithmically related first signal may be performed through the use of turbo codes. Turbo codes are a type of convolutional code that combines two convolutional codes to achieve better performance than a convolutional code by itself. Signals are run through two or more encoding steps, transmitted, and the signals are decoded at the receiving node. The process of turbo coding can be expanded to an additional splitting step and combining step, resulting in an increased code rate without having to change on-air bandwidth or modulation. In some embodiments, the retransmission of the first signal 130 or algorithmically related first signal in the subsequent subslot is further prepared to contain parity bits derived from the data of the first signal 130 or algorithmically related first signal. For example, the data from the first signal 130 or the algorithmically-derived first signal may be encoded into data bits and parity bits. The convolutional codes used in the coding scheme are systematic convolutional codes, or are codes where the original message bits can be recovered by reordering the sequence of the bits. In some embodiments, the coding scheme and the convolutional codes used in the coding scheme are associated within STANAG 4538 data link protocols or other code combining automatic repeat request (ARQ) protocols.

For example, the coding scheme may include combining the convolutional codes into a turbo code. For instance, the turbo code may be encoded by sending the data through a convolutional encoder, then sending an interleaved copy of the data through the same convolutional encoder. The original data, checksum 1, and checksum 2 are combined into one data stream. In another example, for an n-bit input of $X_1 X_2 X_3 \ldots X_n$, the encoded sequence will be $X_1 Y_1 Z_1 X_2 Y_2 Z_2 X_3 Y_3 Z_3 \ldots X_n Y_n Z_n$, where $X_1 \ldots X_n$ are the data bits, $Y_1 \ldots Y_n$ are the checksum bits, and $Z_1 \ldots Z_n$ are the checksum bits from an interleaved convolutional encoder.

In some embodiments, the coding scheme may include splitting the turbo code into two or more data streams, wherein a first data stream comprises checksum bits from the first convolutional encoder and data bits, and a second data stream comprises checksum bits from the interleaved convolutional encoder and interleaved data bits. For example, the encoded sequence $X_1 Y_1 Z_1 X_2 Y_2 Z_2 X_3 Y_3 Z_3 \ldots X_n Y_n Z_n$ may be further split into two signals: $X_1 X_2 Y_2 X_3 Y_3 \ldots X_n Y_n$ and $I_1 Z_1 I_2 Z_2 I_3 Z_3 \ldots I_n Z_n$, where $X_1 \ldots X_n$ are the data bits, $Y_1 \ldots Y_n$ are the checksum bits from the convolutional encoder, $Z_1 \ldots Z_n$ are the checksum bits from the interleaved convolutional encoder, and $I_1 \ldots I_n$ are the interleaved data bits.

In some embodiments, the coding scheme may include preparing and retransmitting the algorithmically related first signal in a subsequent subslot. Once separated into two or more signals, the data streams may be transmitted independently from each other. For example, the data stream containing checksum bits from the convolutional encoder may be transmitted in a first subslot, wherein the data stream containing checksum bits from the first interleaved convolutional encoder may be transmitted in a second subsequent subslot. It should be noted that the independent data streams may also be sent within different subslots within the same time slot. In some embodiments, the coding scheme may include receiving the transmitted data stream (e.g., by a receiver on a node 110). In some embodiments, the coding scheme may include at least one of combining the data streams into a turbo code and decoding the data stream with a turbo code decoder, or decoding one or more data streams with a Viterbi decoder. For example, a node 110 may receive the two data streams from the transmitted split signal, each from separate slots, and combine them. The interleaver may be different on both slots 220, as the reception of any two slots 220 may be decoded with a turbo code decoder. When transmitted in subsequent slots 220, with a high enough SNR either reception can be received independently. For example, if both transmissions were received, but both receptions have errors, the data can be combined and decoded with a turbo code decoder. In another example, a Viterbi decoder may be used to decode the received signals, particularly if at high SNR values (i.e., the coded signals may be decoded through different iterations of decoders until one decoder is found with the fewest errors or zero errors. In some embodiments, three or more convolutional codes (e.g., a "super turbo code") may be utilized to encode and decode first signals or algorithmically related first signals.

In some embodiments, the first signal 130 or algorithmically related first signal is further prepared to contains parity bits derived from the data of the first signal 130 or algorithmically related that are different from the parity bits of one or more preceding retransmissions. In some embodiments, the data from one or more combinations of a first signal 130 and subsequent algorithmically related signals are evaluated, and a retransmission of the first signal 130 or algorithmically related first signal if prepared based on the evaluation.

In some embodiments, the combination of the received first signal or algorithmically related first signal can at least one of increase the number of decoding algorithms that can recover the data or decrease the code rate.

In some embodiments the coding scheme may be identical for any retransmission. In some embodiments, the coding scheme may be different for any retransmission.

In some embodiments, the decoding scheme can decode any retransmission independently. In some embodiments, the decoding scheme can be improved by the reception of multiple retransmissions. In some embodiments, multiple decoding schemes can be used to decode a single transmission. In some embodiments, multiple decoding schemes can be used to decode receptions improved by the reception of multiple retransmissions. It should be known that one slot, multiple slots, or a combination of slots may be used in association with the coding scheme. For example, multiple subslots may be used for redundant messaging (e.g., in case that an initial signal is missed). It should be noted that the method 850 allows the encoding of a first signal 130 into two coded signals with differing coding properties, and allows the reception of either of the two coded signals to be received in order to recover data from the first signal 130 with a Viterbi decoder, or reception of both signals (with errors) to be decoded by a Turbocode decoder.

In some embodiments, the coding scheme further includes a code puncturing scheme, wherein data streams within two or more subslots coding redundant first signals are punctured with a unique puncture pattern. Data puncturing is the process of removing some parity bits from an encoded signal after encoding with an error-correction code, and is commonly associated with convolutional or turbo codes. Puncturing reduces the number of transmitted bits, which increased the overall data transmission rate. For example, the turbo convoluted code $X_1Y_1X_2Y_2X_3Y_3$ . . . may be punctured and transmitted as the code $X_1Y_1X_2\_X_3Y_3$ . . . , with the punctured 'X' to be expanded when decoded upon reception to read as $X_1Y_1X_2$ 0 $X_3Y_3$ . . . . The nature of the punctured turbo code (e.g., or other punctured, convolutionally encoded code) is that the payload data is still intact once the transmission is decoded.

In embodiments, first signals or algorithmically related first signals in multipath or subslot-repeated transmissions may be punctured multiple times and expanded. This puncture rate expansion works with both systematic and non-systematic convolutional codes as long as the transmitted data is the same underlying sequence that has been punctured differently.

Figure 9:
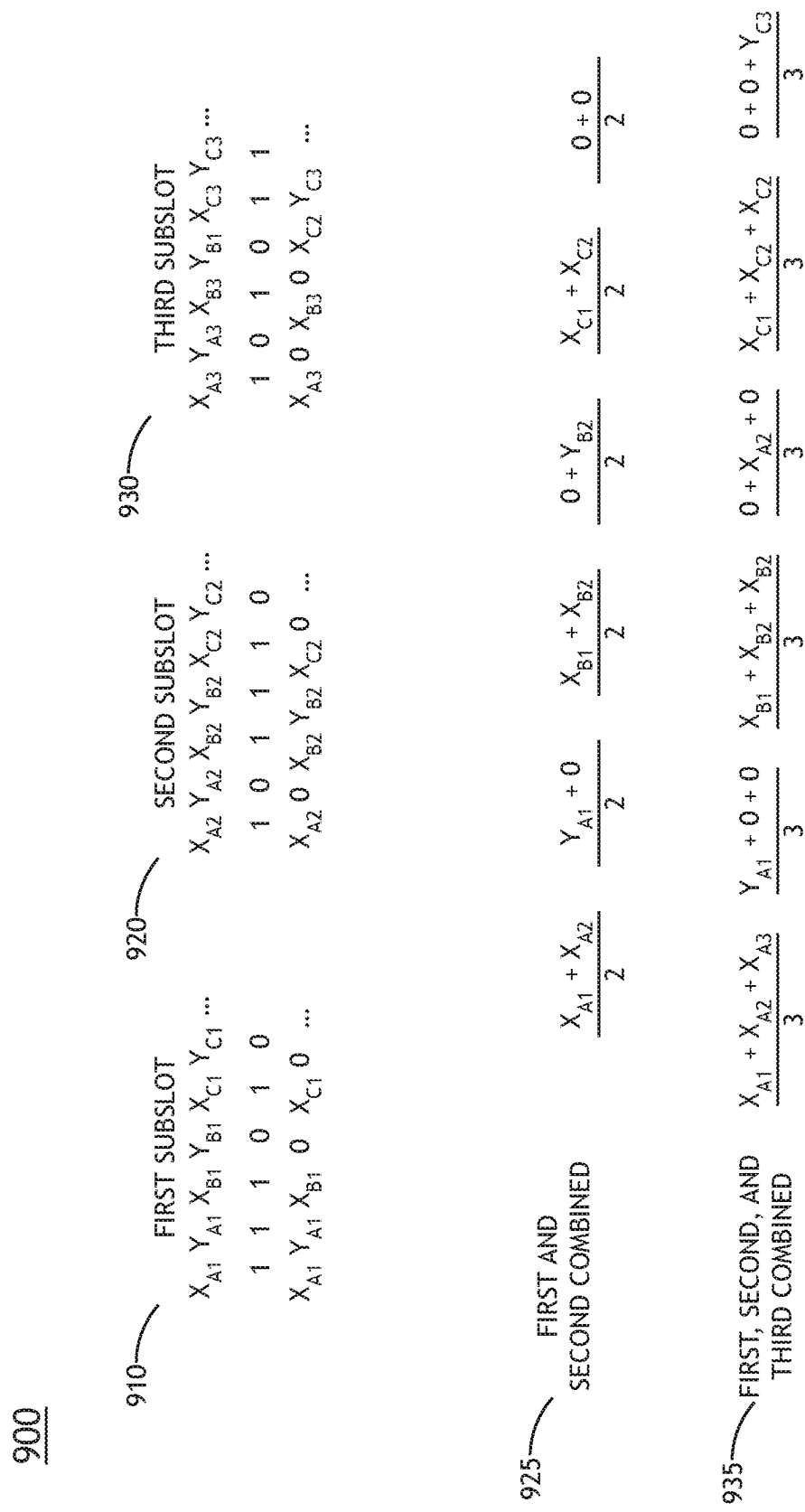
FIG. 9 is a diagram illustrating signal conversion using puncture rate expansion within a subslot, in accordance with one or more embodiments of this disclosure.

FIG. 9 is a diagram illustrating a setup 900 for puncture rate expansion within a slot, in accordance with one or more embodiments of this disclosure. For example, for the first subslot 910, the convoluted data $X_{A1}$ $Y_{A1}$ $X_{B1}$ $Y_{B1}$ $X_{C1}$ $Y_{C1}$ . . . is punctured using the puncture pattern 111010. On reception, if the CRC passes, then the reception was satisfactory and the data can be retransmitted. If the CRC fails, the data is not satisfactory and the soft decisions are stored for the next slot. The data after the first reception is expanded after the first reception to produce $X_{A1}$ $Y_{A1}$ $X_{B1}$ 0 $X_{C1}$ 0 . . . .

Continuing this example, before transmitting on the second slot 920, the data is reencoded and punctured with a second distinct pattern, 101110, a pattern capable of converting a signal of $X_{A2}$ $Y_{A2}$ $X_{B2}$ $Y_{B2}$ $X_{C2}$ $Y_{C2}$ to $X_{A2}$ 0 $X_{B2}$ $Y_{B2}$ $X_{C2}$ 0 . . . that may be transmitted. On reception, the soft decisions are combined in such a way that there are fewer expanded bits, using the first and second combined equation 925.

Continuing this example, before transmitting on the third slot 930, the data is reencoded and punctured with a third distinct pattern, 101011, a pattern capable of converting a signal of $X_{A3}$ $Y_{A3}$ $X_{B3}$ $Y_{B1}$ $X_{C3}$ $Y_{C3}$ to $X_{A3}$ 0 $X_{B3}$ 0 $X_{C3}$ $Y_{C3}$ . . . that is transmitted. On reception, the soft decisions are combined in such a way that all checksum bits have been transmitted at least once, using the first, second, and third combined equation 935.

In some embodiments, the code puncturing scheme is adjusted to optimize the number of times that the bits are punctured. For example, it may be more suitable to puncture a non-systematic convolutional code with retransmissions set up to minimize the number of times the same unique bit is analyzed, and maximizing the number of different bits that are analyzed. For instance, if two of six bits are punctured using a non-systematic convolutional code, each bit will be analyzed twice after three transmissions, whereas a systematic convolutional code may analyze some bits three times, and other bits only once.

Both the expanded use of turbo codes and puncture rates may modify the code rate without having to change the on-air bandwidth or modulation, which allows either a longer range, or a lower transmit power for the same probability of correct reception. Lower transmit power will increase the battery life of power constrained nodes (e.g., battery powered radios) and reduce the range in which adversaries can detect radio transmitters. Each expansion method has its own advantage and disadvantage. Puncture rate expansion has a lower complexity receiver and can be used with higher data rates or with less processing power. Puncturing also reduces redundancy, which increases the code rate i.e., from rate 1/2 to rate 3/4) making the transmission less robust. Turbo code expansion has a more complex receiver but can operate with poorer signal quality.

In order for a telecommunication network 100 to dynamically reconfigure itself, all of the nodes 110 need to know as much as possible about the topology of the telecommunication network 100. The management data of the telecommunication network 100 is all overhead data as far as the user is concerned and ideally would be transmitted in a way that doesn't impact the user (e.g., through transmitting in a different frequency).

When two nodes 110 that are in range of each other transmit on the same frequency, their transmissions interfere with each other. If the nodes 110 are transmitting identical data, the interference can be constructive and improve the reception at a receiver node 110. If the data is different the interference is destructive and can prevent reception of either transmission at the receiving node 110.

FIG. 10A is a diagram illustrating two transmitting nodes 110 operating in a telecommunication network 100 with on-air collisions. Here, the transmitting nodes are only two hops away from each other. Signals transmitted by transmitting nodes one and three collide at node two, whereas node four only receives one signal from node three. With only two nodes 110 acting as a relay node, transmitting nodes can never be far enough apart that there will not be on air collisions. FIG. 10B is a diagram illustrating two transmitting nodes 110 operating in a telecommunication network 100 without on-air collisions (e.g., the transmitters are three hops apart.

A potential for interference in transmitting with relay nodes 110 arises from signals retransmitted from relay nodes 110 interfering with new signals sent from initiating nodes 120. For example, after sending a first signal 130 to a relay node 110, in the first subslot 230, an initiating node 120 may then transmit overhead data (e.g., a second signal) to other nodes 110 in a subsequent subslot 230. If the node 110 receiving the initial signal retransmits the first signal 130 or algorithmically related first signal in the second subslot 230, the first signal 130 and the overhead data will interfere with each other. In this scenario, additional frequencies may be utilized. For example, in some embodiments, the initiating node 120 is further configured to transmit a second signal in the second subslot 230 (e.g., subsequent subslot) or a third subslot 230 subsequent to the third subslot in a different frequency than the retransmitted first signal or algorithmically related first signal 130. It is important to note that one or more nodes 110 of the communication network 100 may comprise half duplex devices that communicate with other half-duplex devices, but not simultaneously. For example, for these half-duplex devices, the relay will receive in the first subslot 230, transmit in the second subslot 230 and will not be able to receive another signal until the third subslot.

Figure 11A:
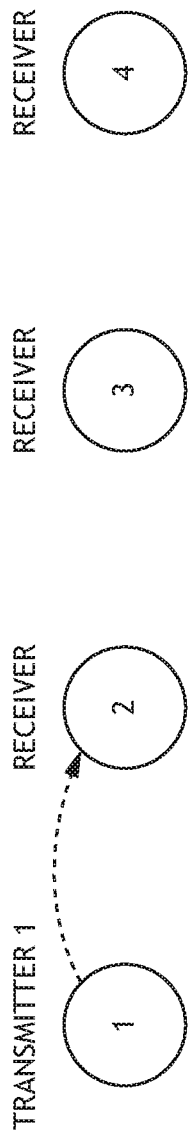
FIG. 11A-C are diagrams illustrating a method for relaying transmissions without collisions in a multiple subslot and multiple frequency telecommunication network, in accordance with one or more embodiments of this disclosure.
Figure 11B:
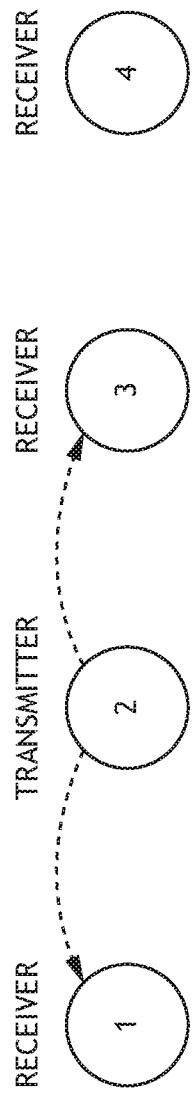
Figure 11C:
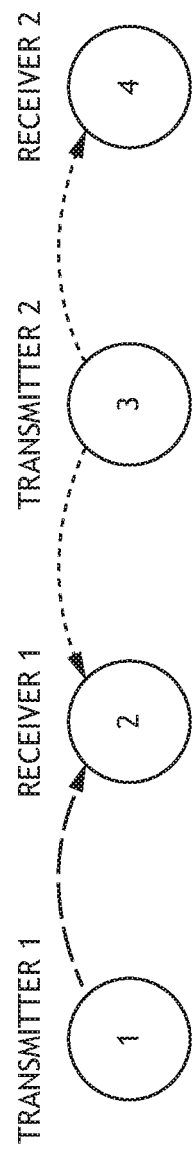

FIG. 11A-C is a diagram illustrating a method for relaying transmissions without collisions in a three-relay telecommunication network 100. In this example, a first signal 130 from node one is initially transmitted to node two in subslot one (e.g., FIG. 11A). Node two then transmits the first signal 130 to node three in subslot two (e.g., FIG. 11B). Node one also receives a retransmitted first signal or algorithmically related first signal 130 from node two, but disregards it with respect to retransmitting the first signal 130 or algorithmically related first signal. However, node one may also take note of other aspects of the received transmission (e.g., whether no other retransmission is heard, or whether the retransmission is transmitted on the same frequency, either in the next subslot or in a later first subslot). When the transmission to node three has completed, and before node one transmits overhead data, both node one and node two will switch to a secondary frequency. In FIG. 11C, node three is shown transmitting the first signal 130 or algorithmically related first signal to nodes two and four, while node one is transmitting overhead data to node two using the secondary frequency (e.g., in a second subslot 230 subsequent to the first subslot 230). The two signals reaching node two do not interfere with each other, as the frequencies of the two transmissions are different.

Figure 12A:
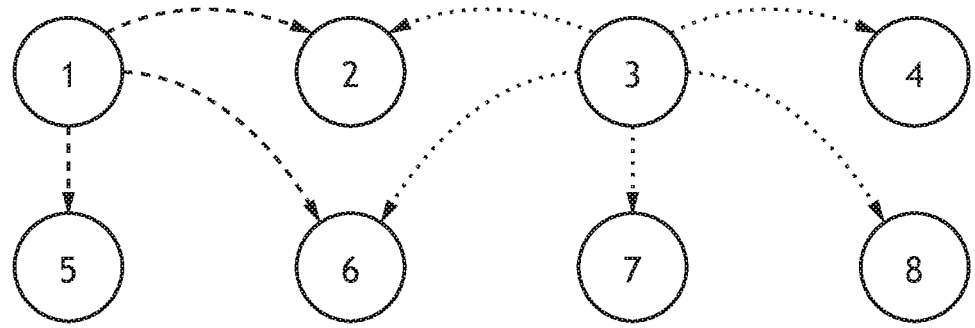
FIG. 12A-C are diagrams illustrating the use of frequency diversity in an eight-node mesh TDMA network, in accordance with one or more embodiments of this disclosure.
Figure 12B:
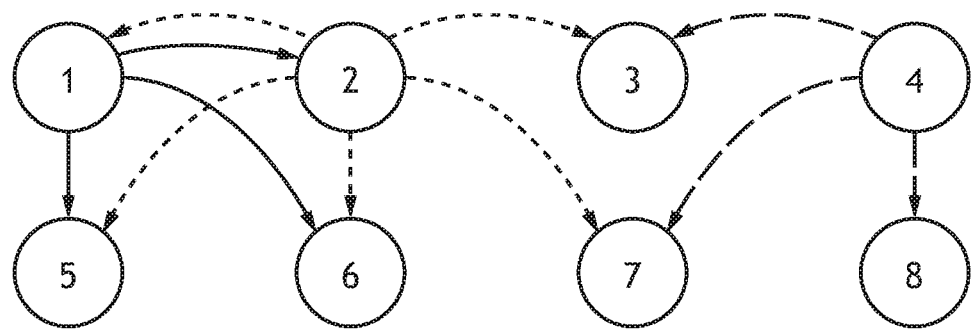
Figure 12C:
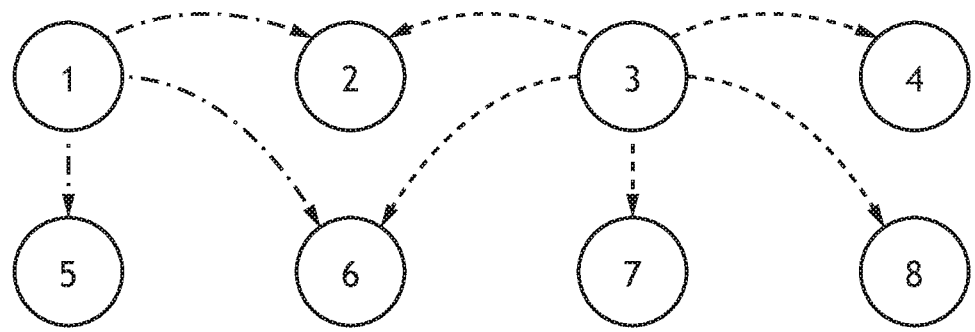

Relay networks using frequency diversity along with multiple relay subslots can greatly reduce collisions in more complex networks where there are multiple concurrent transmissions. FIG. 12A-C are diagrams illustrating the use of frequency diversity in an eight-node mesh TDMA network using a first, a second, and a third subslot, respectively. Transmissions with similar frequencies are shown with identical arrow patterns in FIGS. 12A-C.

In some embodiments, at least one node 110 that is not within the range of the initiating node 120 (e.g., nodes three, four, seven, and eight are not in range of initiating node one in FIG. 12A) is configured to transmit a second signal or algorithmically related second signal in at a first subslot 230 and/or a second subslot 230 subsequent to the first subslot 230 in a different frequency than initiating node one. For example, node three in FIG. 12A, out of range of the initiating node 120 (e.g., node one), has been elected to transmit a second signal or algorithmically related second signal to neighboring node 110 using a different frequency that that used by the initiating node 120 to send a first signal 130 to nodes two, five and six. However, nodes two and six will not receive the second signal or algorithmically related second signal if they are only capable of receiving on a single channel and are configured to listen for the signal from node one in this subslot. The second signal or algorithmically related second signal may contain data similar or dissimilar to the first signal 130 or algorithmically related first signal.

It is important to note that all nodes within the communication network 100 may act as relays when they are capable of doing so. By having all nodes 110 always acting as relay nodes when possible, no overhead is needed to assign specific nodes for relaying, reducing resource needs required to operate the communication network 100. In FIG. 12B, one of the nodes 110 that received the first signal 130 from node one (e.g., node two) retransmits the first signal 130 or algorithmically related first signal 130 in the second subslot to nodes 110 in range using the same frequency as the initial transmission of the first signal 130 from node one to node two. At the same time, the node that initially transmitted the first signal 130, node one, is transmitting another signal (e.g., a secondary signal) to the second subslot 230 using a secondary frequency. Also, at the same time, a node not in range of node two, node four is transmitting a third signal within the second subslot 230 using a secondary frequency. Nodes five and six receive both signals from nodes one and two if they are capable of receiving signals on multiple frequencies. If nodes five and six are only capable of receiving a single frequency, then they will only receive transmissions from node one or node two. Node two, acting as a transceiver, would not be able to receive the transmission from node one at the same time that it is transmitting to nodes one, three, five, six and seven. It should be noted that some transmissions in FIG. 12B (e.g., from nodes five and six) were removed for clarity. All nodes that receive a transmission would then automatically retransmit the signal. It should also be noted that the nodes 110 in FIG. 12B have full duplex capability, and can transmit on a different frequency than the frequency for which they are receiving transmissions. Communication networks 100 operating with one or more nodes 110 with half duplex capability may have different relay capabilities or patterns, as half duplex nodes are not capable of transmitting on different frequencies that the frequency for which they are receiving transmissions. For example, a node sending a first signal 130 may wait until after its neighbors have had an opportunity to retransmit the first signal 130 or algorithmically related first signal before sending a second signal in a subsequent subslot on the same or different frequency.

In FIG. 12C, one of the nodes 110 that received the first signal 130 or algorithmically related first signal from node two (e.g., node three) retransmits the first signal 130 or algorithmically related first signal using a third subslot 230 to all neighboring nodes. When this transmission occurs, all nodes within the network have received the first signal 130 or algorithmically related first signal at which time the first signal 130 or algorithmically related first signal will no longer propagate. At the same time, other nodes 110 have transmitted, and may continue to transmit, signals through the telecommunication network 100. Through the use of nodes 110 as relays, frequency diversity, and multiple subslots 230, a signal intending to reach all nodes 110 will do so while still allowing multi-signal communication between sets of nodes 110. As in FIG. 12B, some transmissions in FIG. 12C were removed for clarity (e.g., all nodes that receive a transmission automatically retransmit the signal).

In some embodiments, the method of routing signals in a telecommunication network 100 further includes adjusting the power level of a node based upon at least one characteristic of the reception of the first signal 130 or algorithmically related first signal, or the condition of the neighboring nodes 110. For example, overhead data could be transmitted globally at a high power and a low data rate, which will allow the node to transmit at maximum range. The data waveforms may then adjust the power rate and/or the data rate according to one or more qualities of the link. For instance, the data rate which can impact the topology of the network, and the number of subslots, which affects the overhead, may be jointly optimized to maximize the capacity of the network. Power levels may also be adapted on a node-by-node basis. For example, a node acting only as a relay may be turned off if it is determined that another node may provide the same action (i.e., a reduction of redundant nodes). Also, as mentioned herein, data may also be modulated to increase data rates. For example, switching from a QPSK modulation to an eight-phase shift keying (8PSK) modulation could increase data rate with a compensatory decrease in power usage. By adjusting power locally or globally within the telecommunication network 100, data may be efficiently managed without overextending the data capacity of the telecommunication network 100. Other characteristics of the first signal 130, algorithmically related first signal, or condition of the neighboring nodes may be used as a basis for adjusting the power level of a node. Therefore, the above description should not be interpreted as a limitation of the present disclosure, but merely an illustration.

It should be noted the methods described herein for modifying, delaying, otherwise adapting signals received and/or transmitted by the nodes may be performed by the components operating within the node including but not limited to the controller 500, memory 508, processors 504, or the communication interface 512.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more substeps. Further, other steps or substeps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method of routing first signals in a telecommunication network, wherein the telecommunication network comprises a plurality of nodes, wherein the telecommunication network uses time-division multiple access (TDMA) frames, each TDMA frame being divided into a series of time slots, and each time slot being divided into a number of subslots, the method comprising the steps of:

transmitting a first signal from an initiating node in a first subslot;

receiving the first signal at other nodes in the network in the first subslot; and retransmitting the first signal or an encoding of the first signal configured as an algorithmically related first signal in a second subslot subsequent to the first subslot comprising:

preparing a retransmission of at least one of the first signal or the algorithmically related first signal by two or more nodes via respective controllers, wherein at least two of the first signals or the algorithmically related first signals transmitted by the two or more nodes are time-dispersed; and transmitting the first signal or the algorithmically related first signal via the two or more nodes;

adjusting the number of subslots within each time slot comprising;

receiving communication network information from the two or more nodes retransmitting the first signal or the algorithmically related first signal, wherein the communication network information includes at least one of network topography data or the number of relay nodes in the telecommunication network; and increasing the number of subslots within the time slot based on the received communication network information; and designating a slot following the second subslot as a negative-acknowledgement slot, wherein at least one of the two or more nodes requiring a retransmission of the first signal or the algorithmically related first signal will transmit an automatic repeat request feedback response.

2. The method of claim 1, wherein one or more nodes are further configured to repeat the receiving and retransmitting of the first signal or the algorithmically related first signal by other nodes in subsequent subslots following the second subslot.

3. The method of claim 1, wherein one or more nodes are further configured to control multipath spreading by dithering retransmission delay, wherein a node determines multipath spreading through at least one of self-assessment by the node or reception of control data from another node.

4. The method of claim 1, wherein a first signal of at least one subslot is combined with a replica or an algorithmically related first signal of at least one other subslot to increase a probability of reception.

5. The method of claim 1, further comprising the step of operating a coding scheme wherein the first signal or the algorithmically related first signal further comprises a forward error correction code with a rate less than or equal to one, further comprising at least one of the steps of:

recovering data from the first signal or the algorithmically related first signal and validating an integrity of the first signal or the algorithmically related first signal, wherein a retransmission of the first signal or the algorithmically related first signal in a subsequent subslot following the second subslot is further prepared to contain parity bits derived from the data of the first signal or the algorithmically related first signal, recovering the data from the first signal or the algorithmically related first signal, further comprising the steps of:
  evaluating the data from at least one of the algorithmically related first signal or a combination of the first signal and the algorithmically related first signal; and
  validating the integrity of the data, wherein the retransmission of the first signal or the algorithmically related first signal is further prepared to contain parity bits derived from the data of the first signal or the algorithmically related first signal that are different from parity bits of one or more preceding retransmissions; or recovering the data from the first signal or the algorithmically related first signal, further comprising the step of evaluating the data from any combination of the first signal and subsequent algorithmically related first signals, and validating the integrity of the data, wherein the retransmission of the first signal or the algorithmically related first signal further is prepared.

6. The method of claim 5, wherein a code rate of the coding scheme is decreased based upon an evaluation of the data from the at least one of the algorithmically related first signal or the combination of the first signal and the algorithmically related first signal.

7. The method of claim 1, wherein the telecommunication network further comprises a designation of a slot to object to a scheduled increase in dither of a subsequent retransmission or request a reduction in dither of a subsequent transmission.

8. The method of claim 1, wherein the telecommunication network further comprises a slot dedicated to at least one of vetoing a change in the number of subslots or request an increase in the number of subslots.

9. The method of claim 1, further comprising the steps of:
  requiring each node to report a unique identification when they are the initiating node;
  requiring all nodes to report with an indication of link margin, what nodes they hear a primary transmission of at least one of the first signal or the algorithmically related first signal from;
  reducing a power of a node if all neighboring nodes report a sufficient link margin over a threshold.

10. The method of claim 1, wherein a node of the two or more nodes that retransmits the first signal or the algorithmically related first signal is configured to retransmit the first signal or the algorithmically related first signal in a subslot subsequent to the first subslot on a different frequency than the first signal received by the node.

11. The method of claim 1, wherein the initiating node is further configured to transmit a second signal or an algorithmically related second signal in a subslot subsequent to the first subslot on a different frequency than the retransmitted first signal or the algorithmically related first signal.

12. The method of claim 1, wherein at least one node not within range of the initiating node is configured to transmit at least one of a second signal or an algorithmically related second signal in at least one of a subslot or a subslot subsequent to the subslot on a different frequency than the transmitted first signal or the algorithmically related first signal.

13. The method of claim 1, wherein an initial TDMA frame starts asynchronously on a transmission of a first signal by the initiating node.

* * * * *